US011577758B2

(12) United States Patent
Jiang et al.

(10) Patent No.: US 11,577,758 B2
(45) Date of Patent: Feb. 14, 2023

(54) AUTONOMOUS VEHICLE PARK-AND-GO SCENARIO DESIGN

(71) Applicant: Baidu USA LLC, Sunnyvale, CA (US)

(72) Inventors: Shu Jiang, Sunnyvale, CA (US);
Jiaming Tao, Sunnyvale, CA (US);
Jinyun Zhou, Sunnyvale, CA (US); Qi Luo, Sunnyvale, CA (US); Jinghao Miao, Sunnyvale, CA (US); Jiangtao Hu, Sunnyvale, CA (US); Jiaxuan Xu, Sunnyvale, CA (US); Yu Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 156 days.

(21) Appl. No.: 16/734,146

(22) Filed: Jan. 3, 2020

(65) Prior Publication Data
US 2021/0206397 A1 Jul. 8, 2021

(51) Int. Cl.
| | |
|---|---|
| *B60W 60/00* | (2020.01) |
| *G05D 1/02* | (2020.01) |
| *G05D 1/00* | (2006.01) |
| *B60W 30/18* | (2012.01) |
| *B60W 30/16* | (2020.01) |

(52) U.S. Cl.
CPC ...... *B60W 60/00274* (2020.02); *B60W 30/16* (2013.01); *B60W 30/18163* (2013.01); *G05D 1/0088* (2013.01); *G05D 1/0214* (2013.01); *B60W 2552/53* (2020.02); *B60W 2554/80* (2020.02); *G05D 2201/0212* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 10,175,695 B2* | 1/2019 | Seo | ...... | G05D 1/0212 |
| 2016/0075331 A1* | 3/2016 | Tomozawa | ...... | B60W 10/18 |
| | | | | 701/41 |
| 2020/0317188 A1* | 10/2020 | Lai | ...... | G08G 1/144 |
| 2020/0361451 A1* | 11/2020 | Noguchi | ...... | G08G 1/145 |
| 2021/0107484 A1* | 4/2021 | Green | ...... | B60W 30/18036 |

OTHER PUBLICATIONS

Sawangchote et al., "Automated Parking Area Optimization for Garage Construction using Geometric Algorithm", 2017 International Conference on Digital Arts, Media and Technology (ICDAMT) (Year: 2017).*
Ozturk et al., "A New Approach for Exiting from Parking Lot based on Artificial Neural Network", 2019 7th International Symposium on Digital Forensics Security (ISDFS) (Year: 2019).*

* cited by examiner

*Primary Examiner* — Tamara L Weber
(74) *Attorney, Agent, or Firm* — Womble Bond Dickinson (US) LLP

(57) ABSTRACT

In one embodiment, when an autonomous driving vehicle (ADV) is parked, the ADV can determine, based on criteria, whether to operate in an open-space mode or an on-lane mode. The criteria can include whether the ADV is within a threshold distance and threshold heading relative to a vehicle lane. If the criteria are not satisfied, then the ADV can enter the open-space mode. While in the open-space mode, the ADV can maneuver it is within the threshold distance and the threshold heading relative to the vehicle lane. In response to the criteria being satisfied, the ADV can enter and operate in the on-lane mode for the ADV to resume along the vehicle lane.

21 Claims, 11 Drawing Sheets ically coupled to one or more servers 103-104 over a

AUTONOMOUS VEHICLE PARK-AND-GO SCENARIO DESIGN

TECHNICAL FIELD

Embodiments of the present disclosure relate generally to operating autonomous vehicles. More particularly, embodiments of the disclosure relate to performing transitioning from a parked position to driving on a vehicle driving lane with an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

When autonomous driving vehicle (ADV) is parked at a parking spot, for example, in a parking lot or along a curb on a street, the vehicle should be able to restart and drive to a destination based on requests of the driver.

Depending on the parking spot and the environment of the ADV, static obstacles such as other parked vehicles can obstruct the ADV. Additionally, a location of the ADV might be off the driving lane. A parking spot can be parallel or perpendicular to the destination lane. In some cases, parking spots can be angled relative to the destination driving lane. Thus, it is beneficially to address such issues in the field of autonomous driving.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A system and process for autonomous vehicles relates to navigating an ADV from a parking spot to a vehicle driving lane. In some embodiments, if obstacles are present, and/or if the ADV is not within a threshold distance and heading angle relative to the vehicle driving lane, the ADV can put into effect an open-space mode that allows the ADV to generate an open-space trajectory and navigate towards the vehicle driving lane, including at least one forward movement and backward movement. If the ADV is within the threshold distance and angle, and no obstacles are present or within a predetermined distance threshold, then the ADV can proceed to an on-lane mode, where the ADV can drive on a trajectory along the driving lane towards an intended destination, e.g., mainly forward movement.

Figure 1:
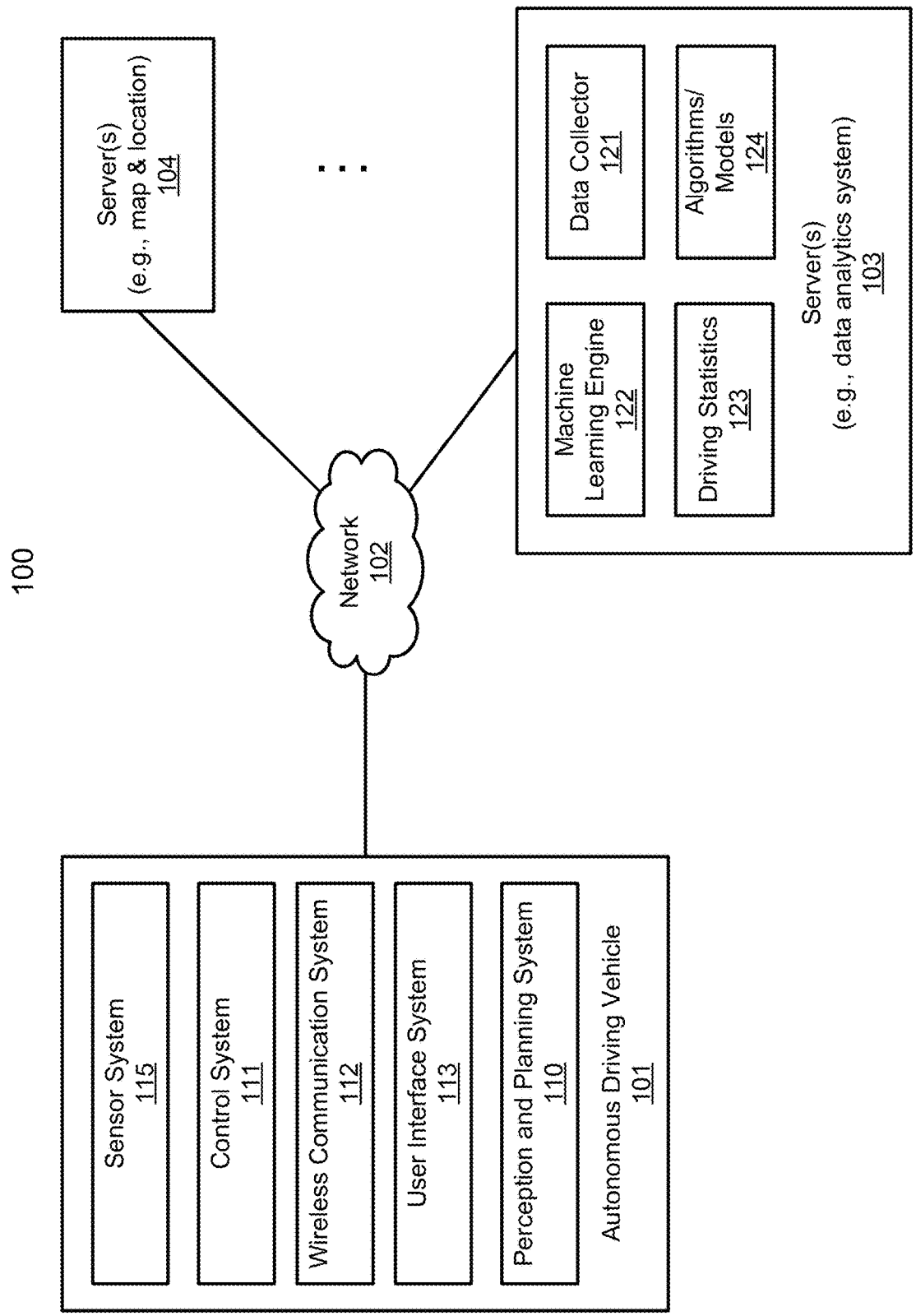
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
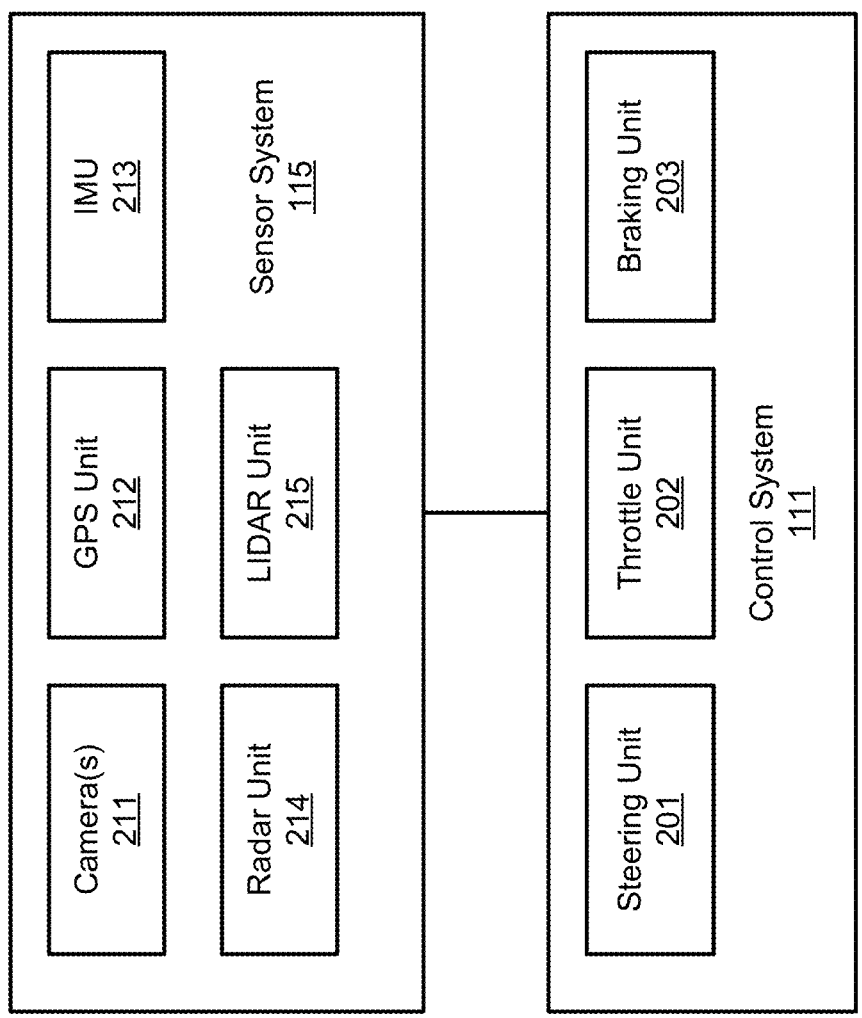
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In some embodiments, any combination of the sensors of the sensor system (e.g., the cameras, scanners, and/or detectors) can gather data used to detect obstacles.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include the park and go algorithm that involves an on-lane planner and an open-space planner as described below. Algorithms 124 can then be uploaded on ADVs to be utilized during autonomous driving in real-time.

Figure 3A:
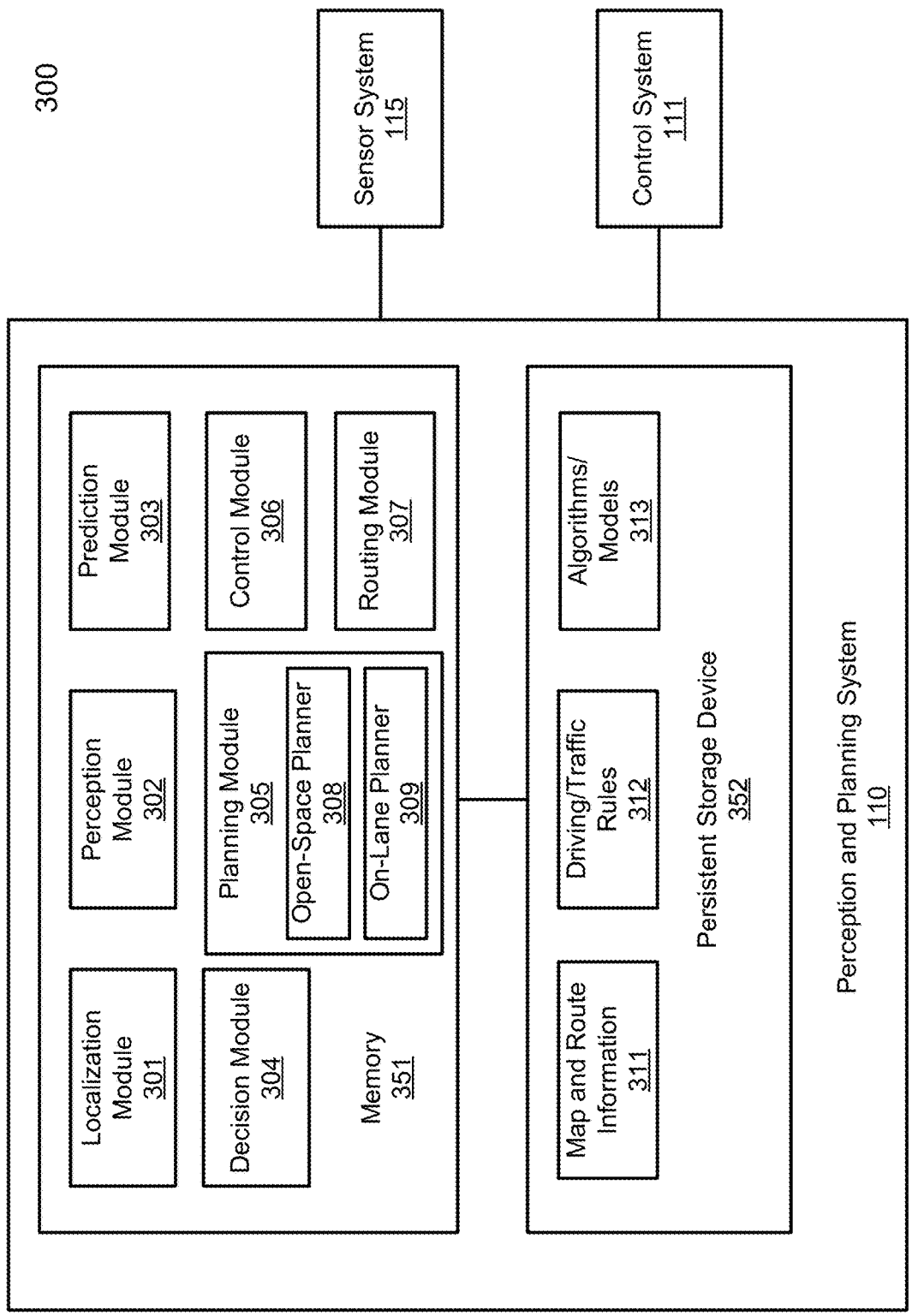
FIGS. 3A-3B are block diagrams illustrating an example of a perception and planning system used with an autonomous vehicle according to one embodiment.
Figure 3B:
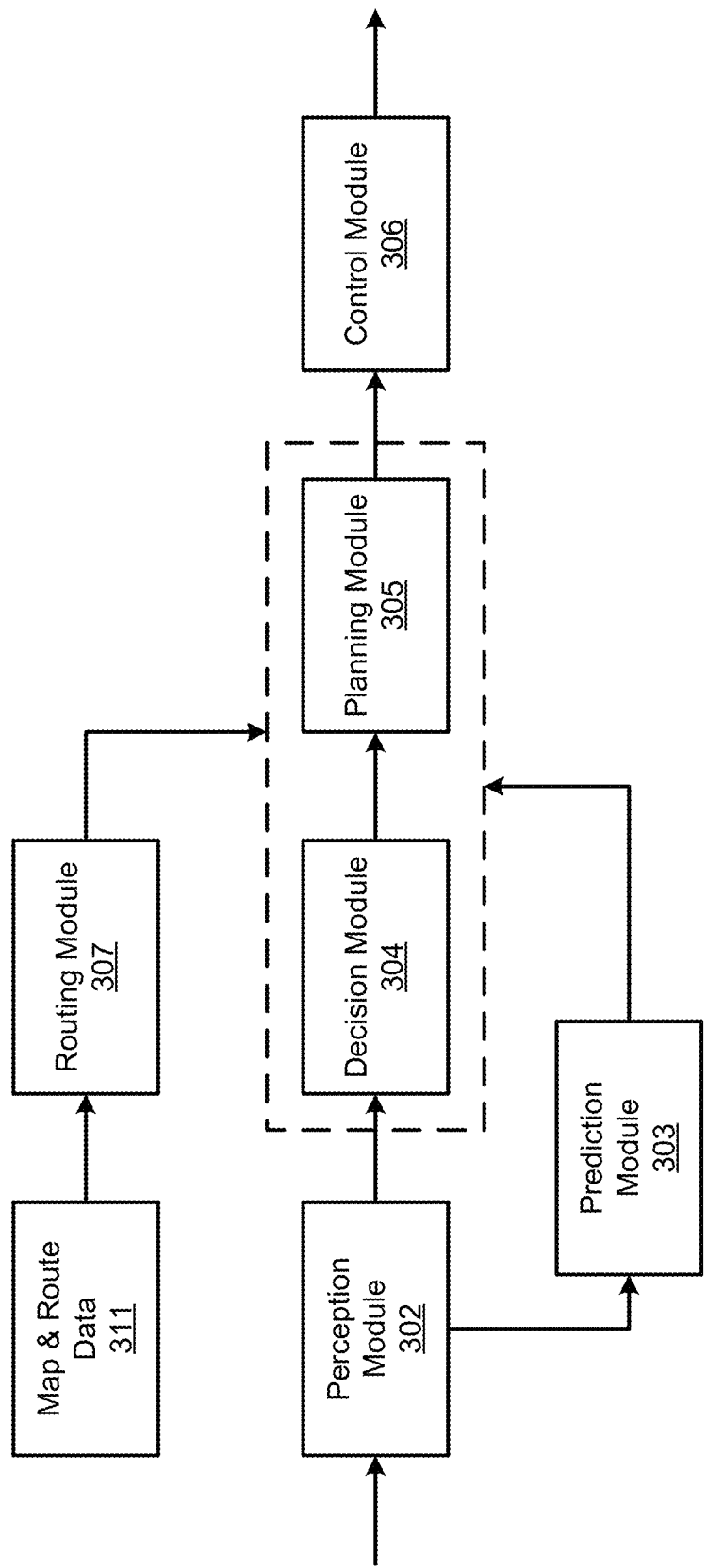

FIG. 3A and FIG. 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules shown may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or other obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Planning module 305 can have an on-lane planning module 309 and an open-space planning module 308. The on-lane planning module generates the planning and control data of the ADV when the ADV is operating in on-lane mode. The on-lane planning module can generate controls that limit and restrict the ADV to traveling along a trajectory over a vehicle driving lane. In on-lane mode, the on-lane trajectories are generated that restrict the ADV to traveling on a vehicle driving lane. As discussed in other sections, the ADV can switch between open-space mode and on-lane mode based on certain criteria, for example, when transitioning from a parked location to a vehicle driving lane.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The above planning process to drive a vehicle based on the lane configuration is referred to as an on-lane planning process, which may be performed at least in part by on-lane planning module 309 (also referred to as an on-lane planner). During the on-lane planning, a vehicle is typically moving forward according to path planned based on the lane configuration, such as, a reference line of the lane. Another type of planning is referred to as an open-space planning, which may be performed by open-space planning module 308 (also referred to as an open-space planner). During the open-space planning, the vehicle can move forwardly and backwardly without following the lane configuration or lane lines. The vehicle can move freely based on the relative position with respect to other obstacles. It does not follow the typical traffic rules.

Figure 4:
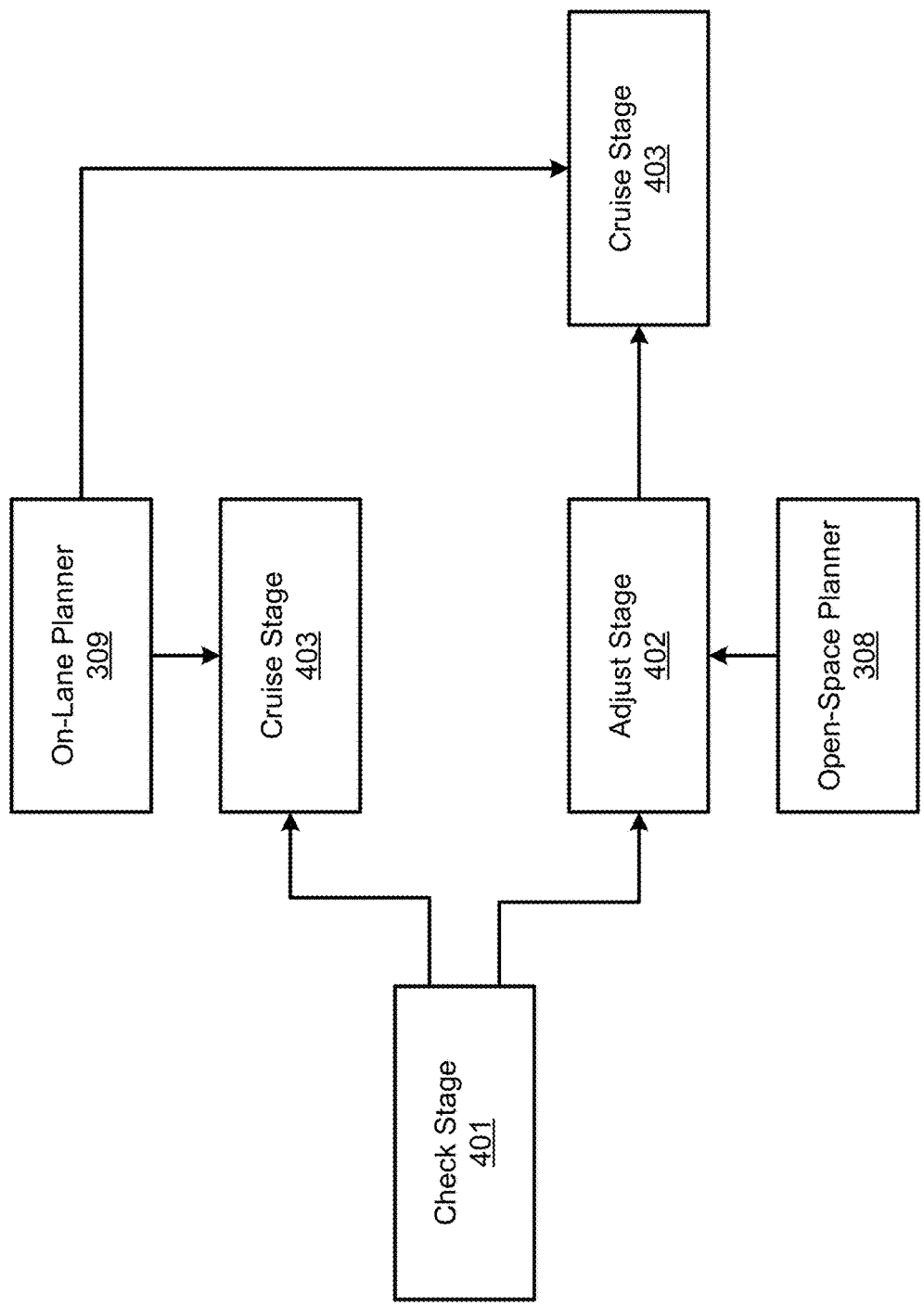
FIG. 4 shows a block diagram illustrating a processing flow of autonomous planning according to one embodiment.

FIG. 4 is a block diagram illustrating a processing flow of autonomous planning according to one embodiment. Referring to FIG. 4, the entire flow process includes three stages: 1) check stage 401, 2) adjust stage 402, and 3) cruise stage 403. When a vehicle is stationed in a current position, during check stage 401, the system checks based on the driving environment perceived at the point in time, whether a set of criteria have been satisfied to use online planner 309 as normal driving planner as described above. Under certain circumstances, the vehicle may not be positioned in a way that is suitable for on-lane planner to operate the vehicle. For example, when a vehicle is parked in a parking spot instead of within a lane, or the driving environment within which the vehicle is in does not contain any lane line or other lane configuration information (e.g., no lane information available from the map).

In one embodiment, the set of criteria may include whether the vehicle is close enough to a lane and its heading direction is close to a lane direction of a lane. Alternatively, the set of criteria may include whether the vehicle is too close to an obstacle such as next to adjacent parked vehicle in a parking spot. If it is determined that the set of criteria have not been satisfied, the processing flow enters adjust stage 402. During adjust stage 402, open-space planner 308 is invoked to perform open space planning, including back and forth movements to adjust the position of the vehicle until the set of criteria have been satisfied. Once the set of criteria have been satisfied, the processing flow enters cruise stage 403. During the cruise stage 403, on-lane planner 309 is invoked to perform the normal planning as described above.

Figure 5:
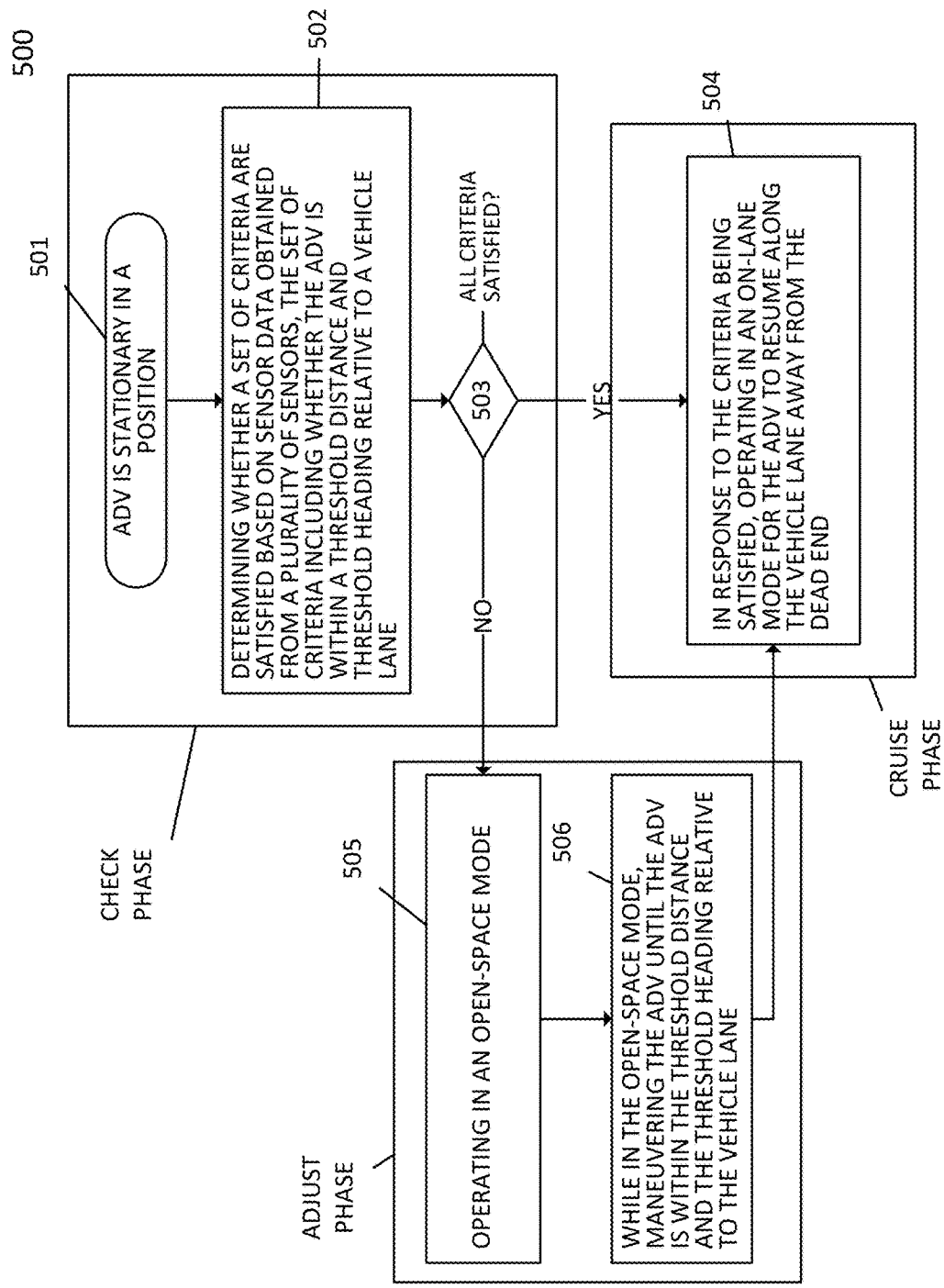
FIG. 5 shows a process for transitioning from a parked location to a vehicle driving lane, according to one embodiment.

Referring to FIG. 5, a process 500 is shown that can be performed by one or more processors of an ADV to drive from a parked position to vehicle driving lane. A vehicle driving lane can be a designated driving lane such as but not limited to a traffic lane in a parking lot or parking structure or a traffic lane on a street. At operation 501, the ADV is stationary at a parked location (e.g., off of and away from a vehicle lane). For example, if a passenger enters the ADV and is ready to begin a journey to a destination, the can begin this process to enter the driving lane and proceed towards the destination.

At operation 502, the process includes determining whether a set of criteria are satisfied, based on sensor data obtained from a plurality of sensors. The set of criteria includes whether the ADV is within a threshold distance and threshold heading relative to a vehicle lane. Based on this determination, the ADV can decide whether to operate in an open-space mode or an on-lane mode. During the on-lane mode, ADV controls limit the ADV to traveling along a trajectory over the vehicle lane. During the open-space mode, the ADV controls are removed, allowing the ADV to travel freely off the vehicle lane. In some embodiments, these modes are exclusive of each other, such that the ADV cannot operate in both modes at once. In some embodiments, all criteria of the set of criteria must be satisfied to proceed to operation 504, otherwise the process proceeds towards operation 505.

As mentioned, the criteria includes whether the ADV is within a threshold distance and threshold heading relative to a vehicle lane. The criteria can further include whether an obstacle (for example, another vehicle, a parking stop, a curb, a pedestrian, a wall, large debris, or other object) impedes a path of the ADV in reaching the vehicle lane. A threshold distance can be measured based on any point of the ADV (for example, at the front or at a center of the ADV) to a point on the vehicle driving lane (for example, a point of entry of the ADV onto the lane, or the point at which the distance between the ADV and the vehicle driving lane is the shortest).

The threshold heading can be an angle between the heading of the ADV and the trajectory of the driving lane. Understanding that the driving lane can have a different trajectory at different points on the driving lane, the trajectory of the driving lane can be taken at the point of entry where the ADV shall enter the driving lane. The point of entry can be determined, for example, based on a sufficiently short distance between the ADV and the driving lane, that allows for the ADV to steer onto the driving lane. The point of entry can vary from one situation to another, for example, based on a distance between the ADV and the driving lane, the heading of the ADV in the parked position relative to the vehicle driving lane, and whether or not obstacles are present between the ADV and the vehicle driving lane.

In some embodiments, determining whether one or more obstacles impedes the ADV from reaching the vehicle lane is based on sensor data, such as, but not limited to sensor data generated by one or more cameras, a radar unit, and a LIDAR unit. For example, the ADV can analyze camera images using known computer vision techniques to recognize obstacles between the ADV and the vehicle driving lane. Similarly, radar and LIDAR can indicate existence and location of objects around the ADV. Once the ADV maneuvers past the obstacle and/or the obstacle no longer impedes the ADV's path to the vehicle driving lane, then this criterion is satisfied.

In some embodiments, a determination of whether the ADV is within the threshold distance and the threshold heading relative to the vehicle lane is based on at least one of: map data and sensor data. For example, map data can indicate a direction of the vehicle lane at a point on the vehicle lane. IMU data can indicate a heading of the ADV while in the parked position and/or during maneuvering of the ADV. The point can be an estimated point of entry or the closest point between the ADV and the vehicle lane. If a difference between the heading of the ADV and the direction of the vehicle lane at the point is within the threshold heading, then this particular criterion is satisfied. In some embodiments, a threshold heading can be an angle of 20 degrees. Thus, once the ADV heading is within 20 degrees of the vehicle lane, the ADV, this criterion would be satisfied. In other embodiments, the threshold heading is 10 degrees. In other embodiments, the threshold heading is 5 degrees.

Similarly, the map data and sensor data can be used to determine a location of the ADV and a location of a point at the vehicle lane. The point can be an estimated point of entry or at point at a shortest distance between the ADV and the vehicle driving lane. A distance can be calculated between the ADV and the point at the vehicle lane. If the distance between the ADV and the point at the vehicle lane is at or less than the threshold distance, than the criterion is satisfied. In some embodiments, the distance threshold is 5 meters. In other embodiments, the distance threshold is 2 meters. In other embodiments, the distance threshold is 1 meter.

At operation 503, if the criteria are not satisfied, then the process proceeds to operation 505. If the criteria are satisfied, then the process proceeds to operation 504. In other words, the process can determine, during a check phase, whether to enter an adjustment phase or a cruise phase.

At operation 505, the process includes entering into in an open-space mode. The ADV can thus operate under the open-space mode and move freely about without control rules that limit the ADV to driving along a trajectory on driving lanes.

At operation 506, while in the open-space mode, the process includes maneuvering the ADV until the ADV is within the threshold distance and the threshold heading relative to the vehicle lane. The ADV can also maneuver around and past obstacles that impeded the ADV from reaching the driving lane directly. Maneuvering the ADV includes generating a series of throttle and steering commands to effect at least one of a forward movement and reverse movement of the ADV. For example, referring briefly to FIGS. 3A and 3B, the different modules can work in concert to generate maneuver one or more open-space trajectories which the control module 306 uses to generate control commands (a series of throttle and/or steering commands) to effect forward and/or reverse movement of the ADV along the open-space trajectories to get closer to the vehicle driving lane, align the ADV with the vehicle driving lane, and/or move past obstacles safely, if any such obstacles are present.

Referring back to FIG. 5, at operation 504, in response to the criteria being satisfied, the process includes operating in an on-lane mode for the ADV to resume along the vehicle lane. In this cruise phase, the ADV can proceed towards the passenger's destination, while driving along designated vehicle driving lanes. It should be understood that, if all the criteria are satisfied when the ADV is stationary at the location off of the vehicle lane (during the check phase), the ADV enters and operates in the on-lane mode without entering and operating in the open-space mode.

Parking spots can have different orientations and positions relative to a driving lane. For example, a bike lane or bus lane may come between a parking spot and a driving lane, thereby increasing a distance between the two. Some parking spots are parallel to a driving lane while others (typically in a parking lot) are perpendicular or oblique (at an angle not perpendicular or parallel) with respect to the driving lane.

Figure 6:
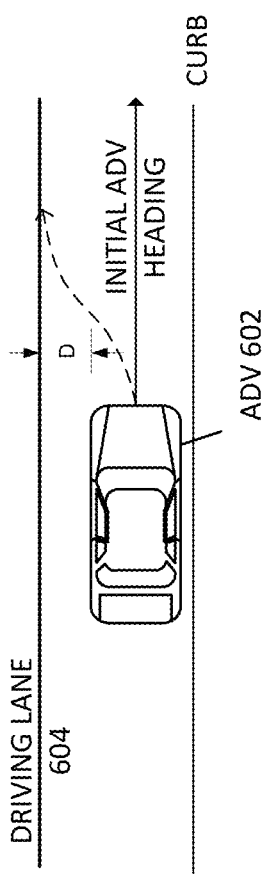
FIGS. 6-9 show examples of an ADV transitioning from a parked location to a vehicle driving lane.

For example, referring to FIG. 6, an ADV 602 can be parked at a curb on a street. A passenger wishes to drive to a destination and the ADV has generated a route that requires the ADV to drive onto driving lane 604. A check can be performed by the ADV to determine whether the above mentioned criteria are satisfied. In this example, the ADV heading is parallel to the driving lane. Assuming the distance D is within a threshold distance and no obstacles are present, the ADV can proceed to an on-lane mode (without having to operate in open-space mode) and drive directly onto the driving lane.

Figure 7:
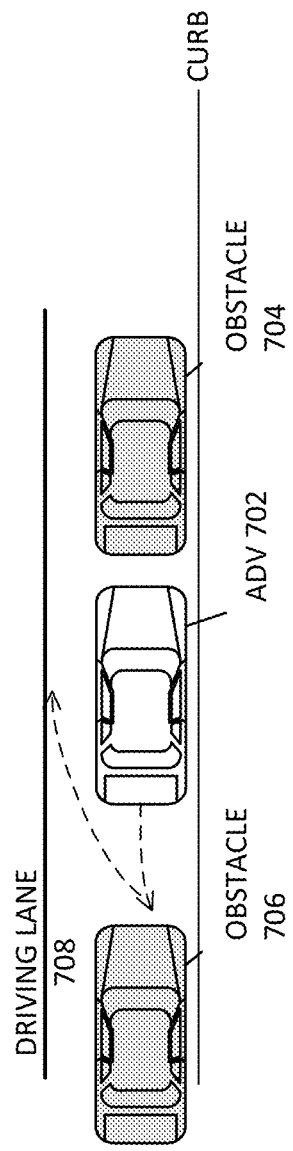
Figure 8:
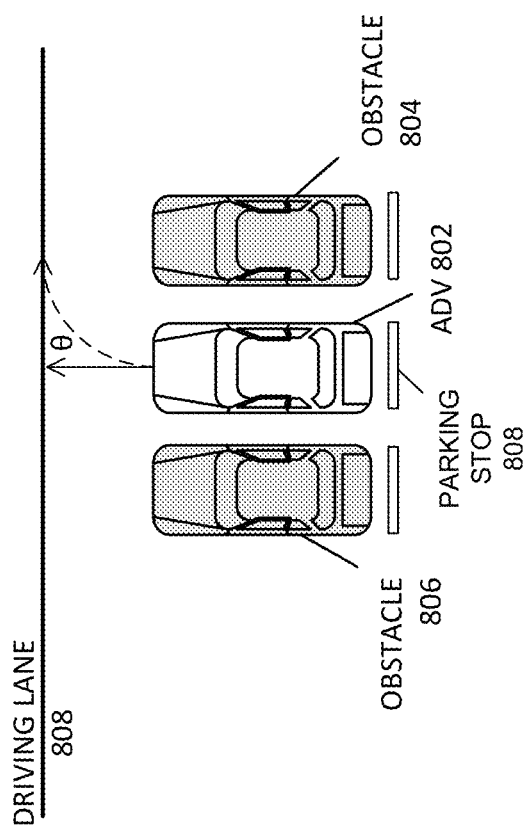

In another example, the same scenario is shown in FIG. 7 as was described in FIG. 6, except this time, two vehicles (obstacle 704 and obstacle 706) are parked in front of and behind the ADV 702. In this case, during the check phase, the ADV senses that obstacle 704 is too close to the ADV and/or impeding the ADV from reaching the driving lane 708 in a single forward motion. In response, the ADV enters open-space mode and generates a commands (reverse, throttle, steering) to reverse. When the ADV has enough space, the ADV can generate additional commands (forward, throttle, steering) to move within a threshold distance and threshold heading relative to the driving lane. Once the criteria are satisfied, the ADV can enter on-lane mode where the ADV will drive along a trajectory over the driving lane.

In another example, the ADV 802 is parked in a parking spot that is roughly perpendicular to a driving lane 808. Two obstacles (vehicle 804 and 806) flank the ADV on both sides. Although a distance between the ADV and the driving lane might be satisfied, the heading of the ADV would not be within a threshold heading relative to the driving lane, thus, the ADV enters open-space mode to generate open-space trajectories (not required to be on a driving lane) to maneuver the ADV until the criteria are satisfied. Once satisfied, the ADV enters the on-lane mode and proceeds to drive along the driving lane 708.

It should be noted that a parking spot 808 is shown at the rear of the ADV and does not present itself as an obstacle to the ADV in this particular situation. If, however, the parking stop was located at the front of the ADV, then the ADV can, in open-space mode, generate a reverse trajectory and other trajectories to eventually move towards the ADV and satisfy the criteria.

Figure 9:
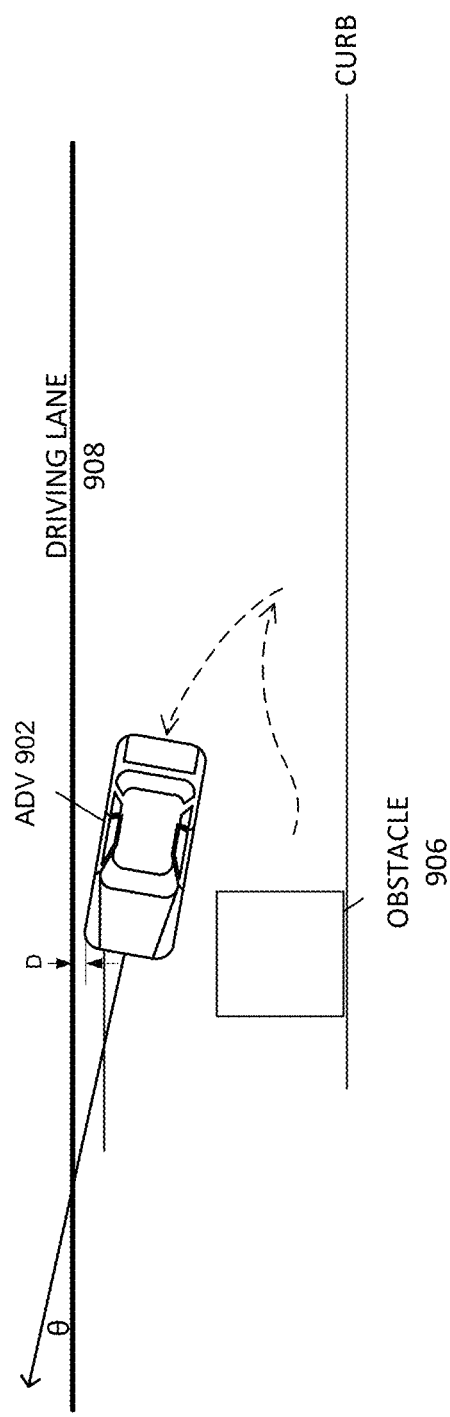

In FIG. 9, the ADV 902 senses an obstacle 906 impeding the ADV's path to the driving lane 908. The obstacle can be a structure (e.g., a wall), a garbage bin, large debris, or other object. The ADV can enter open-space mode and generate open-space trajectories and a series of control commands to effect movement over those open-space trajectories to maneuver the ADV towards the driving lane until the criteria are satisfied. A difference between the ADV heading and direction of the driving lane 908 is shown as an angle θ. Once the distance D satisfies the threshold distance, and the angle θ satisfies the heading threshold, then the ADV can transition from open-space mode to planning mode and proceed towards an intended destination.

Figure 10:
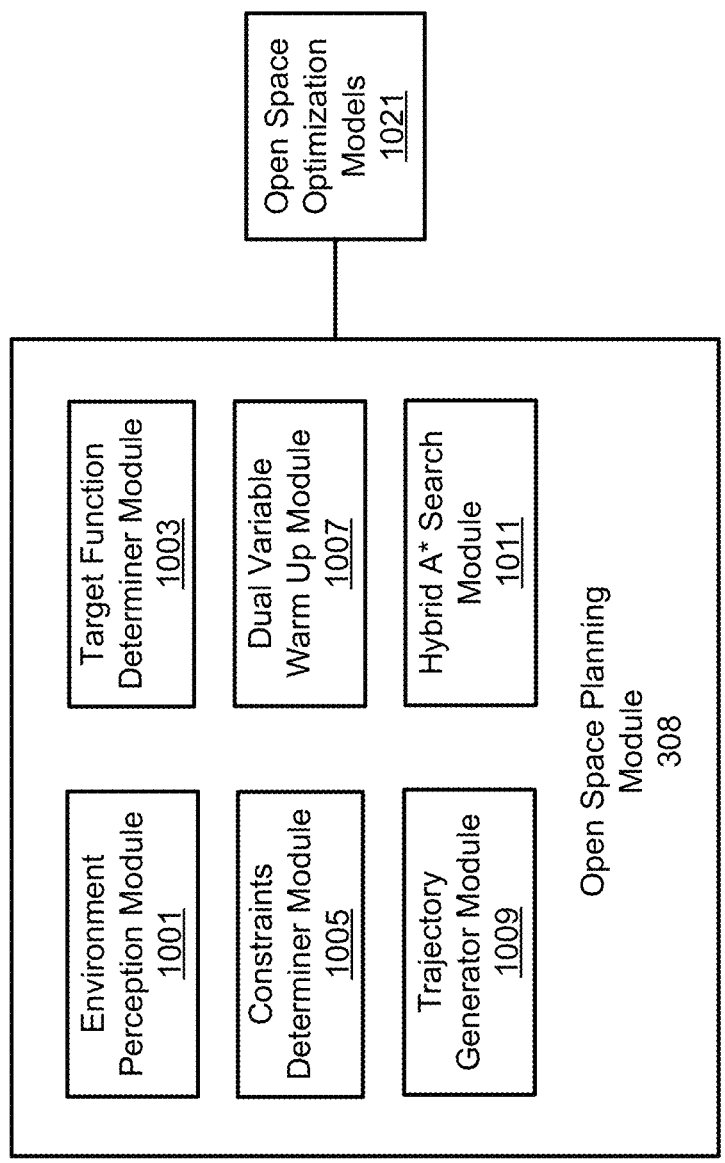
FIG. 10 shows an open-space planning module according to one embodiment.

Referring to FIG. 10, in one embodiment, open-space planning module 308 includes environment perception module 1001, target function determiner module 1003, constraints determiner module 1005, dual variable warming up module 1007, trajectory generator module 1009, and hybrid A* search module 1011. Environment perception module 1001 can perceives an environment of the ADV. Target function determiner module 1003 can determine a target function for an optimization model (e.g., open-space optimization model 1021 (as part of models 313 of FIG. 3A)) to optimize. Constraints determiner module 1005 can determine constraints for the optimization model. Constraints can include inequality, equality, and bound constraints. Dual variable warming up module 1007 can apply a quadratic programming (QP) solver to a target (objective) function to solve for one or more variables (such as dual/two variables) subject to some constraints, where the target function is a quadratic function. Trajectory generator module 1009 can generate a trajectory based on the solved variables. Hybrid A* search module 1011 can search for an initial trajectory (zig zag, non-smooth trajectory without consideration for observed obstacles) using a search algorithm, such as an A* search algorithm, or a hybrid A* search algorithm.

Figure 11:
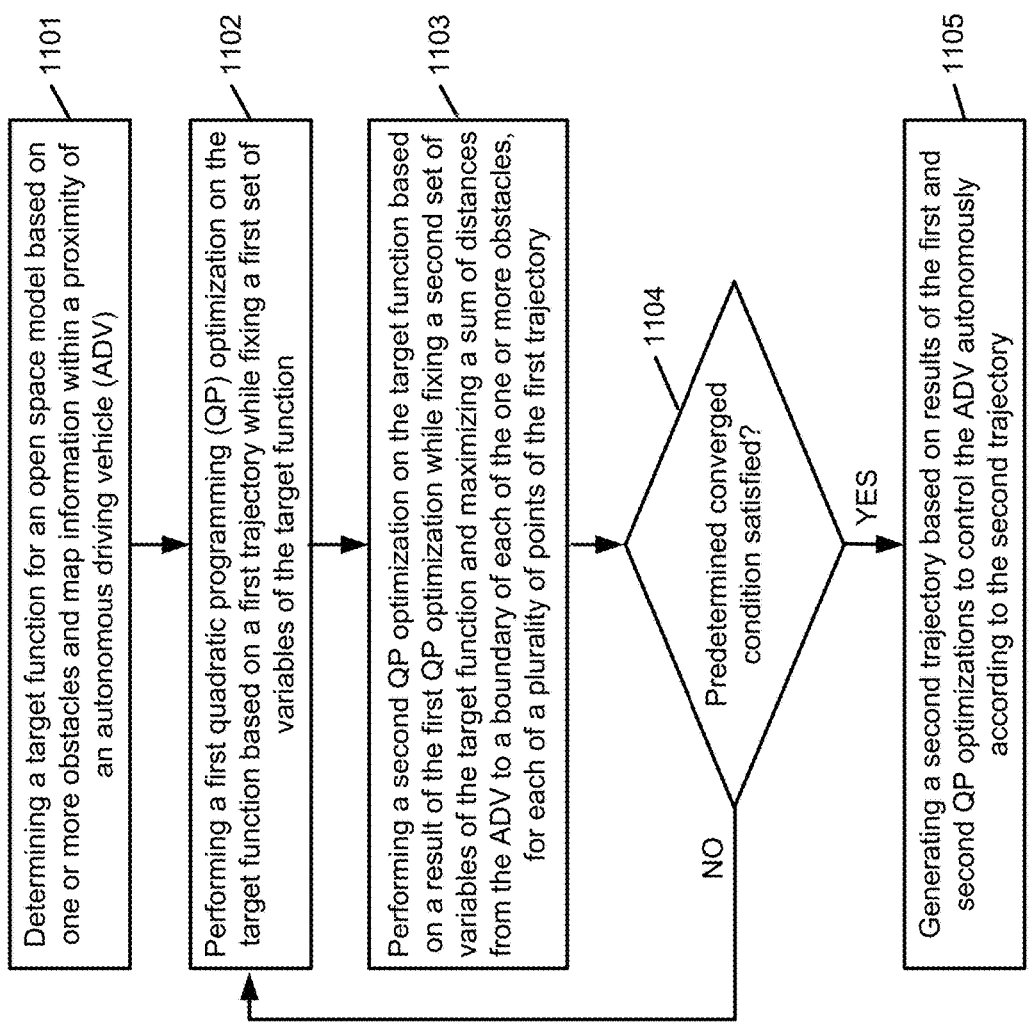
FIG. 11 shows a work flow for an open-space planning module for an ADV according to one embodiment.

FIG. 11 is a flowchart illustrating an example of a work flow for the open-space planning module for an ADV according to one embodiment. Referring FIG. 11, in operation 1101, processing logic extracts environment constraints from HD map, and moving obstacles constraints from prediction module, e.g. prediction module 303, to generate the open-space optimization algorithm, and initializes matrices/vectors for the constraints of the optimization algorithm. In one embodiment, the optimization model can be previously generated and uploaded on the ADV (e.g., model 421 of FIG. 4, as part of models 313 of FIG. 3A). Constraints can include distances from the vehicle to the open road boundaries, dimensions of accessible roadways, road curbs, and one or more obstacles. The obstacles can include moving obstacles such as cars and moving pedestrians, and non-moving obstacles such as buildings, blockades, and fences. The moving obstacles can be processed by the prediction module to determine the predicted locations for the moving obstacles at some later point in time. These obstacles and constraints can be modeled into matrices and vectors for an optimization algorithm.

An example of an optimization algorithm for a controlled object and obstacles can be given as:

$$\mathcal{J}(x, u, d) = \sum_{k=0}^{K} l(x(k), u(k)) + \alpha \|x(k) - x_F\|_2^2 + \beta \sum_{m=0}^{M} \sum_{k=0}^{K} d_m(k)$$

wherein:

(1) $\mathcal{J}$ a is a cost function based upon the autonomous driving vehicle (ADV) state variable x, ADV control variable u, and a collection d of distances from the ADV to each object in a collection of M obstacles, (2)

$$\sum_{k=0}^{K} l(x(k), u(k))$$

is a cost function that is used to smooth trajectory and save control energy.

(3) x(k) is a trajectory for a discretized time step k, (4) u(k) is represents control inputs to the ADV at time step k, (5) α>0 represents a hyper-parameter to minimize the final state's position to the target $x_F$, (6) $\alpha \|x(k)-x_F\|_2^2$ is a penalty for the deviation between the kth location and heading of the ADV at time k, x(k), and the final location and heading, $x_F$, of the ADV, tuned by constant, α, (7) β>0 is a hyper-parameter to maximize the total safety distances between the ADV and the M obstacles and other boundaries, and (8)

$$\beta \sum_{m=0}^{M} \sum_{k=0}^{K} d_m(k)$$

is a collision-avoidance buffer-zone aware $d_m(k)$, added to the original target function.

The above open-space target function for the trajectory of the ADV is subject to:

(1) $x(0)=x_0$, wherein $x_0$ is an initial state of the ADV at time increment k=0, (2) x(k+1)=f(x(k), u(k)), wherein f is a vehicle dynamic model, such as a bicycle model of a vehicle, (3) h(x(k), u(k))≤0, wherein h is a function that includes limitations of the ADV, such as maximum heading ratio, velocity, and acceleration of the vehicle.

(4) $-g^T\mu_m(k)+(A_m(x(k))-b_m)^T \lambda_m(k)+d_m(k)>0$, wherein matrix A and vector b relates to sizes and locations of one or more obstacles surrounding the vehicle, (5) $G^T\mu_m(k)+R(x(k))^T A_m{}^T \lambda_m(k)=0$, wherein $g^T$ and $G^T$ relate to a size and location of the ADV, respectively. λ and μ describe dual variables representing distances between obstacles and the vehicle, and R is a rotation matrix, measuring a rotation of the ADV relative to the M obstacles, based on a reference direction of the ADV. Some variables may not be initialized without an initial trajectory, e.g., R is not defined without an initial trajectory. Matrix A and vector b relate to sizes and locations of one or more obstacles surrounding the ADV. The obstacles can be modeled as, e.g., polygons.

(6) $\|A_m^T \lambda_m(k)\|_2 \leq 1$, wherein matrix $A_m$ represents the $m^{th}$ polygon of a set of obstacles, (7) $\lambda_m(k) \geq 0$, $\mu_m(k) > 0$, wherein $\lambda_m(k)$ and $\mu_m(k)$ are dual variables representing distances between the $m^{th}$ polygon of a set of obstacles and the ADV at time step k of the trajectory, (8) $d_m(k) \leq 0$, describes the safety distance between the vehicle and the $m^{th}$ obstacle polygon at time step k, for k=0, ... K, m=1, ..., M, and d is the notation of their collection.

In operation 1102, open-space planning module 308 can perform a first quadratic programming (QP) optimization on the target function on a first trajectory, while fixing a first set of variables of the target function. In an embodiment, the first set of variables can include the dual variables, λ and μ, representing distances between polygons of sets of obstacles and the ADV over time increments k=0 ... K. In an embodiment, the first trajectory can be obtained by a Hybrid A* search.

In operation 1103, open-space planning module 308 can perform a second QP optimization on the target function while fixing a second set of variables and maximizing a sum of distances away from the ADV to a boundary of each of the one or more obstacles over each of a plurality of points of the first trajectory. The distance of the ADV away from any polygon m of a set of obstacles at time step k can be expressed as a negative number, such that the optimization seeks to maximize the distance (i.e., the magnitude of the negative distances) of the ADV away from each polygon m of a set of obstacles for all time steps k=0 ... K of the first trajectory by optimizing the sum:

$$\beta \sum_{m=0}^{M} \sum_{k=0}^{K} d_m(k)$$

In operation 1104, it can be determined whether the optimization of the open-space model target function converges to a predetermined condition. If so, then method 1100 continues at operation 1105, otherwise method 1100 continues at operation 1102.

In operation 1105, open-space planning module 308 can generate a second trajectory based on the results of the first and second QP optimizations. The ADV can then be controlled autonomously according to the second trajectory.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implement method performed by an autonomous driving vehicle (ADV), the method comprising:
   determining whether a set of criteria are satisfied based on sensor data obtained from a plurality of sensors, the set of criteria including whether the ADV is within a threshold distance and threshold heading relative to a vehicle lane;

in response to the set of criteria not being satisfied, beginning an operation in an open-space mode, including adjusting a position of the ADV via one or more forward and backward movements, and continuing to operate in the open-space mode until the ADV is positioned within the threshold distance and the threshold heading relative to the vehicle lane;

in response to determining that the set of criteria has been satisfied, operating in an on-lane mode, wherein during the open-space mode, an optimization algorithm is applied to maximize a distance between the ADV and one or more obstacles wherein the optimization algorithm includes a cost function that maximizes the distance between the ADV and the one or more obstacles while penalizing a deviation of the ADV from a final location and a final header that satisfies the set of criteria; and in the on-lane mode, resuming autonomous driving along the vehicle lane.

2. The method of claim 1, wherein during the open-space mode, the ADV predicts a future location of the one or more obstacles.

3. The method of claim 1, wherein the on-lane mode and open-space mode are exclusive to each other, and during the on-lane mode, ADV controls limit the ADV to traveling along a trajectory over the vehicle lane and during the open-space mode, the ADV controls are removed allowing the ADV to travel freely off the vehicle lane.

4. The method of claim 1, wherein the set of criteria further includes whether an obstacle impedes a path of the ADV in reaching the vehicle lane.

5. The method of claim 1, wherein if all the criteria are satisfied when the ADV is stationary at a current location off the vehicle lane, the ADV enters the on-lane mode without entering the open-space mode.

6. The method of claim 1, wherein the vehicle lane is a lane in a parking lot, or a traffic lane.

7. The method of claim 1, wherein a current position of the ADV is parallel, perpendicular, or oblique with respect to the vehicle lane.

8. The method of claim 1, wherein the distance threshold is approximately 5 meters.

9. The method of claim 1, wherein the heading threshold is approximately 20 degrees.

10. A non-transitory machine-readable medium having instructions stored therein, which when executed by a processor, cause the processor to perform operations of operating an autonomous driving vehicle (ADV), the operations comprising:

determining whether a set of criteria are satisfied based on sensor data obtained from a plurality of sensors, the set of criteria including whether the ADV is within a threshold distance and threshold heading relative to a vehicle lane;

in response to the set of criteria not being satisfied, beginning an operation in an open-space mode, including adjusting a position of the ADV via one or more forward and backward movements, and continuing to operate in the open-space mode until the ADV is positioned within the threshold distance and the threshold heading relative to the vehicle lane;

in response to determining that the set of criteria has been satisfied, operating in an on-lane mode, wherein during the open-space mode, an optimization algorithm is applied to maximize a distance between the ADV and one or more obstacles wherein the optimization algorithm includes a cost function that maximizes the distance between the ADV and the one or more obstacles while penalizing a deviation of the ADV from a final location and a final header that satisfies the set of criteria; and in the on-lane mode, resuming autonomous driving along the vehicle lane.

11. The machine-readable medium of claim 10, wherein during the open-space mode, the ADV predicts a future location of the one or more obstacles.

12. The machine-readable medium of claim 10, wherein the on-lane mode and open-space mode are exclusive to each other, and during the on-lane mode, ADV controls limit the ADV to traveling along a trajectory over the vehicle lane and during the open-space mode, the ADV controls are removed allowing the ADV to travel freely off the vehicle lane.

13. The machine-readable medium of claim 10, wherein the set of criteria further include whether an obstacle impedes a path of the ADV in reaching the vehicle lane.

14. The machine-readable medium of claim 10, wherein if all the criteria are satisfied when the ADV is stationary at the current location off the vehicle lane, the ADV enters the on-lane mode without entering the open-space mode.

15. The machine-readable medium of claim 10, wherein the vehicle lane is a lane in a parking lot, or a traffic lane.

16. The machine-readable medium of claim 10, wherein a current position of the ADV is parallel, perpendicular, or oblique with respect to the vehicle lane.

17. The machine-readable medium of claim 10, wherein the distance threshold is approximately 5 meters.

18. The machine-readable medium of claim 10, wherein the heading threshold is approximately 20 degrees.

19. A data processing system, comprising:

a processor; and a memory coupled to the processor storing instructions, which when executed by the processor, cause the processor to perform operations of operating an autonomous driving vehicle (ADV), the operations including determining whether a set of criteria are satisfied based on sensor data obtained from a plurality of sensors, the set of criteria including whether the ADV is within a threshold distance and threshold heading relative to a vehicle lane;

in response to the set of criteria not being satisfied, beginning an operation in an open-space mode, including adjusting a position of the ADV via one or more forward and backward movements, and continuing to operate in the open-space mode until the ADV is positioned within the threshold distance and the threshold heading relative to the vehicle lane;

in response to determining that the set of criteria has been satisfied, operating in an on-lane mode, wherein during the open-space mode, an optimization algorithm is applied to maximize a distance between the ADV and one or more obstacles wherein the optimization algorithm includes a cost function that maximizes the distance between the ADV and the one or more obstacles while penalizing a deviation of the ADV from a final location and a final header that satisfies the set of criteria; and in the on-lane mode, resuming autonomous driving along the vehicle lane.

20. The system of claim 19, wherein during the open-space mode, the ADV predicts a future location of the one or more obstacles.

21. The system of claim 19, wherein wherein the on-lane mode and open-space mode are exclusive to each other, and during the on-lane mode, ADV controls limit the ADV to traveling along a trajectory over the vehicle lane and during the open-space mode, the ADV controls are removed allowing the ADV to travel freely off the vehicle lane.

* * * * *